Oct. 23, 1923.
M. R. KARGE
1,471,488
CUSHION SHAFT COUPLING
Filed June 23, 1920
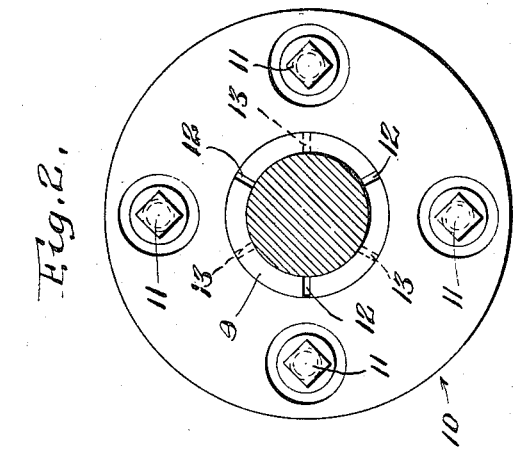
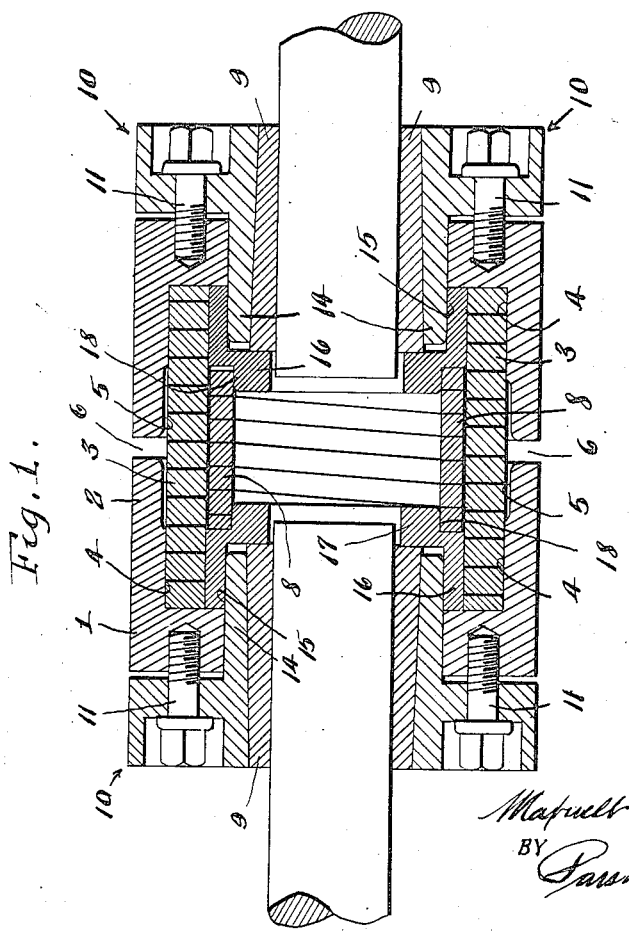
INVENTOR.
Maxwell R. Karge.
BY Parsons & Bodell
ATTORNEYS.

Patented Oct. 23, 1923.                                                                                        1,471,488

UNITED STATES PATENT OFFICE.

MAXWELL ROY KARGE, OF PHOENIX, NEW YORK, ASSIGNOR, BY MESNE ASSIGNMENTS, TO CHARLES J. DECKOP, OF BUFFALO, NEW YORK.

CUSHION SHAFT COUPLING.

Application filed June 23, 1920.   Serial No. 391,067.

*To all whom it may concern:*

Be it known that I, MAXWELL R. KARGE, a citizen of the United States, and a resident of Phoenix, in the county of Oswego and State of New York, have invented a certain new and useful Cushion Shaft Coupling, of which the following is a specification.

This invention relates to cushion shaft couplings or power transmitting elements of the type set forth in my pending application, Sr. No. 285,762, filed March 28, 1919, and has for its object a cushion shaft coupling which is particularly simple, strong and compact in construction, and highly efficient and durable in use, and also such a coupling which can be readily secured by compression means to the ends of the shafts to be coupled. The invention consists in the novel features, and in the combinations and constructions hereinafter set forth and claimed.

In describing this invention, reference is had to the accompanying drawings in which like characters designate corresponding parts in all the views.

Fig. 1 is a longitudinal sectional view of my coupling.

Fig. 2 is an end view thereof.

This cushion shaft coupling comprises, generally, members or parts including means as compression means for securing said parts to the ends of the shafts to be coupled, and a coiled power transmitting torsion spring fixed at its ends to parts or members mountable on the shaft ends respectively. One of said members or parts is mounted on each shaft end. Said members are formed with sleeve extensions which enclose said spring, and against which it expands and binds when torque is applied thereto in one direction, the sleeve extensions having their opposing end faces located near but spaced apart from each other, the space between them being preferably less than the width of one coil of the spring.

The members or parts for attachment to each shaft section comprise a head 1 and compression means for securing it to the shaft end. Each head 1 is formed with a sleeve extension 2 projecting therefrom. 3 is the coiled power transmitting torsion spring enclosed or housed by said sleeve extensions 2, the end coils abutting against the heads and engaging the inner annular faces at 4 of the inner portions of said sleeve extensions. The inner annular faces of the outer end portions of said sleeve extensions 2 are cut away at 5 to provide clearance to permit limited expansion of the spring 3 when torque is applied thereto in a direction tending to expand it, the spring binding on the sleeves at 5 after expanding a predetermined amount, in order to prevent undue expansion and hence breaking of the spring.

The ends of the sleeve extensions 2 are spaced apart at 6 to permit expansion of the spring and also to take care of angularity and misalinement of the shafts within limits. The space 6 is preferably less than the width of one coil to prevent the coil alined with such space from expanding more than the other coils and breaking by being permitted to bulge through said space.

The coils of the spring 3 are preferably rectangular in cross section and are arranged with their opposing faces normally spaced apart slightly but also arranged to engage friction plate or disk fashion when the spring is turned a predetermined amount, and hence to retard further tensioning by causing the spring to act as a solid piece. The spring is intended to contract when normally in operation transmitting motion, and said spring expands so that it binds at 5 on the sleeve extensions 2 of the head 1, only when transmitting reverse motion. In such case, the sleeve extensions 2 prevent undue expansion and tensioning of the spring.

The spring is preferably formed as in my application, Sr. No. 364,712, filed March 10, 1920.

To further guard against undue strain on the spring 3 when torque is being applied thereto in a direction tending to contract this spring, a floating sleeve element 8 is located in the spring, on which it binds, said sleeve element being here shown as coiled, or a sleeve or cylinder cut spirally. It is not necessarily a spring, but merely a floating piece capable of conforming to any angularity or misalinement of the shafts.

The compression means for securing the heads to the shafts comprises, in this form of my invention, a contractile sleeve 9 mountable on each shaft, a compression ring or collar 10 encircling the sleeve, and means as screws 11 for clamping the collars toward the heads and sliding them axially on the contractile sleeves to compress them during such clamping action.

The contractile sleeve 9 may be of any suitable form, size and construction, it being preferably, a single piece having slots 12, 13 extending from opposite ends thereof toward and terminating short of the other end, the slots 12 extending from one end alternating with the slots 13 extending from the other end.

The compression rings or collars 10 are opposed to the outer ends of the heads 1, and each is formed with a sleeve 14 extending through the bore of the adjacent head 1 and into a position in which its end portion is opposed to the inner end portion 4 of the sleeve extension 2, and together therewith forms an annular recess 15 in which the end coils of the spring 3 are fixed. The periphery of the contractile sleeve 9 and the bore of the collar 10 and its sleeve 14 are shaped to have a compression action, as the collar is moved axially inwardly, and usually the contractile sleeve and the bore of the collar and its sleeve are complementally tapered.

The clamping screws 11 extend through the collars 10 and thread into the heads 1. The end coils of the spring 3 are fixed in each annular recess 15 preferably by means of an annular plug inserted between one of the annular walls of the recess and the end coils of the spring.

16 designates the plugs which are inserted between the sleeve 14 of the collar 10 and the inner faces of the end coils of the spring. These plugs 16 are also provided with inwardly extending annular abutments 17 opposed to the inner ends of the contractile sleeves 9 to prevent axial movement of the sleeves during the compressing operation, effected by tightening the screws 11. The plugs are also formed with annular recess grooves or rabbets 18 opening through their peripheral and inner end faces and in which the ends of the floating sleeve 8 are seated. This sleeve 8 is interposed between the plugs and serves to hold them from movement axially toward each other.

From the foregoing, the construction and operation of the coupling is apparent.

What I claim is:

1. A cushion shaft coupling comprising opposing heads, means for securing the heads to the opposing ends of shafts to be coupled, the heads having sleeve extensions extending toward and terminating near and spaced from each other at their opposite ends, and a coiled power transmitting spring enclosed by the sleeve extensions and secured at its ends to the heads respectively, the sleeve extensions being cut away to form a clearance between the intermediate coils of the spring and the inner faces of such extensions whereby the sleeve extensions are normally spaced apart from such intermediate coils and the coils bind on the sleeve extensions when expanded a predetermined distance, substantially as and for the purpose described.

2. A cushion shaft coupling comprising opposing heads, means for securing the heads to the opposing ends of shafts to be coupled, the heads having sleeve extensions extending toward and terminating near and spaced from each other at their opposite ends, and a coiled power transmitting spring enclosed by the sleeve extensions and secured at its ends to the heads respectively, the intermediate coils of the spring being spaced apart from the inner faces of the outer end portions of the bores of the sleeve extensions, the sleeve extensions being cut away to form a clearance between the intermediate coils of the spring and the inner faces of such extensions whereby the sleeve extensions are normally spaced apart from such intermediate coils and the coils bind on the sleeve extensions when expanded a predetermined distance, substantially as and for the purpose specified.

3. A cushion shaft coupling comprising opposing heads, means for securing the heads to the opposing ends of shafts to be coupled, the heads having sleeve extensions extending toward and terminating near and spaced from each other at their opposite ends, and a coiled power transmitting spring enclosed by the sleeve extensions and secured at its ends to the heads respectively, the intermediate coils of the spring being spaced apart from the inner faces of the outer end portions of the bores of the sleeve extensions, and the end coils of the spring engaging the inner faces of the inner end portions of the bores of said extensions, the sleeve extensions being cut away to form a clearance between the intermediate coils of the spring and the inner faces of such extensions whereby the sleeve extensions are normally spaced apart from such intermediate coils and the coils bind on the sleeve extensions when expanded a predetermined distance, substantially as and for the purpose set forth.

4. A cushion power transmitting coupling comprising opposing parts for attachment to the opposing ends of two shafts to be coupled together, said parts forming opposing annular recesses having end walls, a coiled power transmitting spring having its end coils located in the recesses respectively, and abutting against the end walls, and annular means inserted between one of the annular walls of each recess and the end coils of the spring for fixing the said end coils in the recess, substantially as and for the purpose set forth.

5. A cushion power transmitting coupling comprising opposing parts for attachment to the opposing ends of two shafts to be coupled together, said parts forming opposing annular recesses, having end walls, a coiled power transmitting spring having its end coils located in the recesses respectively and abutting against the end walls, and an annular plug inserted between one of the annular walls of each recess and the end coils of the spring for fixing said end coils in the recess, substantially as and for the purpose specified.

6. A cushion shaft coupling comprising opposing heads, a coiled power transmitting spring connected at its ends to the heads respectively, a contractile sleeve arranged within and concentric with each head, and a compression ring slidable on each sleeve, and means coacting with the head for clamping the ring toward the end of the head and sliding the ring axially of the contractile sleeve and the head, abutments arranged to engage the opposing ends of the contractile sleeves, and means for holding the abutments from axial movement, substantially as and for the purpose set forth.

7. A cushion shaft coupling comprising opposing heads, a coiled power transmitting spring connected at its ends to the heads respectively, a contractile sleeve arranged within and concentric with each head, and a compression ring slidable on each sleeve, and means coacting with the head for clamping the ring toward the end of the head and sliding the ring axially of the contractile sleeve and the head, abutments arranged to engage the opposing ends of the contractile sleeves, and a floating sleeve interposed between said abutments and within said spring and supported at its end on said abutments, substantially as and for the purpose specified.

8. A cushion shaft coupling comprising opposing heads, a coiled power transmitting spring connected at its ends to the heads respectively, and compression means for attaching the heads to the opposing ends of the shafts to be coupled, including contractile sleeves on the shafts, compression elements slidable axially on the contractile sleeves, and means interposed between the contractile sleeves, for holding said sleeves from axial movement toward each other including a floating sleeve element located within the spring, substantially as and for the purpose set forth.

9. A cushion shaft coupling comprising opposing parts for attachment to the opposing ends of two shafts to be coupled, the parts for each shaft including a head having a sleeve extension on the inner side thereof, a collar opposed to the outer end of the head and having a sleeve extending through the bore of the head and opposed to the inner end portion of the sleeve extension and together therewith forming an annular recess, means for drawing said collar toward the head and a contractile sleeve within the collar and the sleeve thereof, the bore of the collar and its sleeve and the periphery of the contractile sleeve being shaped to compress the sleeve during axial movement of the collar toward the head, and a coiled torsion spring interposed between said parts and having its end coils located and fixed in said annular recesses, substantially as and for the purpose described.

10. A cushion shaft coupling comprising opposing parts for attachment to the opposing ends of two shafts to be coupled, the parts for each shaft including a head having a sleeve extension, on the inner side thereof, a collar opposed to the outer end of the head and having a sleeve extending through the bore of the head and opposed to the inner end portion of the sleeve extension and together therewith forming an annular recess, means for drawing said collar toward the head, and a contractile sleeve within the collar and the sleeve thereof, the bore of the collar and its sleeve and the periphery of the contractile sleeve being shaped to compress the sleeve during axial movement of the collar toward the head, a coiled torsion spring interposed between said parts and having its end coils located in said annular recesses, and annular plugs extending into the recesses between the end coils of the spring, and the peripheries of the sleeves of said collars, substantially as and for the purpose specified.

11. A cushion shaft coupling comprising opposing parts for attachment to the opposing ends of two shafts to be coupled, the parts for each shaft including a head having a sleeve extension on the inner side thereof, a collar opposed to the outer end of the head and having a sleeve extending through the bore of the head and opposed to the inner end portion of the sleeve extension and together therewith forming an annular recess, means for drawing said collar toward the head, and a contractile sleeve within the collar and the sleeve thereof, the bore of the collar and its sleeve and the periphery of the contractile sleeve being shaped to compress the sleeve during axial movement of the collar toward the head, a coiled torsion spring interposed between said parts and having its end coils located in said annular recesses, annular plugs extending into the recesses between the end coils of the spring and peripheries of the sleeves of said collars, said plugs having abutments located to receive end thrust from the contractile sleeves, substantially as and for the purpose set forth.

12. A cushion shaft coupling comprising opposing parts for attachment to the opposing ends of two shafts to be coupled, the parts for each shaft including a head having a sleeve extension on the inner side thereof, a collar opposed to the outer end of the head and having a sleeve extending through the bore of the head and opposed to the inner end portion of the sleeve extension and together therewith forming an annular recess, means for drawing said collar toward the head, and a contractile sleeve within the collar and the sleeve thereof, the bore of the collar and its sleeve and the periphery of the contractile sleeve being shaped to compress the sleeve during axial movement of the collar toward the head, a coiled torsion spring interposed between said parts and having its end coils located in said annular recesses, annular plugs extending into the recesses between the end coils of the spring and peripheries of the sleeves of said collars, said plugs having abutments located to receive end thrust from the contractile sleeves, and means interposed between the plugs to hold them from endwise movement, substantially as and for the purpose described.

13. A cushion shaft coupling comprising opposing parts for attachment to the opposing ends of two shafts to be coupled, the parts for each shaft including a head having a sleeve extension on the inner side thereof, a collar opposed to the outer end of the head and having a sleeve extending through the bore of the head and opposed to the inner end portion of the sleeve extension and together therewith forming an annular recess, means for drawing said collar toward the head, and a contractile sleeve within the collar and the sleeve thereof, the bore of the collar and its sleeve and the periphery of the contractile sleeve being shaped to compress the sleeve during axial movement of the collar toward the head, a coiled torsion spring interposed between said parts and having its end coils located in said annular recesses, annular plugs extending into the recesses between the end coils of the spring and peripheries of the sleeves of said collars, said plugs having abutments located to receive end thrust from the contractile sleeves, and a floating sleeve located within said spring and being mounted at its end on and thrusting against said annular plugs, substantially as and for the purpose specified.

14. A flexible power transmitting element comprising opposing sections, each comprising a head formed with a rigid annular flange or sleeve extension on its side opposed to the other section the ends of the sleeve extensions being located near each other whereby the sleeve extensions enclose the greater part of the spring, and an annular plug concentric with and located within the flange or sleeve extension, and together therewith forming an annular recess, and a coiled spring having its end coils located in said recesses between the flanges and the plugs, substantially as and for the purpose set forth.

In testimony whereof, I have hereunto signed my name, at Phoenix, in the county of Oswego, and State of New York, this 19th day of April, 1920.

MAXWELL ROY KARGE.